(12) United States Patent
Donaldson et al.

(10) Patent No.: US 10,738,491 B2
(45) Date of Patent: Aug. 11, 2020

(54) POSITIONER FOR MOBILE WORK PLATFORMS

(71) Applicant: Terex South Dakota, Inc., Watertown, SD (US)

(72) Inventors: James Donaldson, Puyallup, WA (US); Andrew Olseene, Seattle, WA (US); Adam Hailey, Kirkland, WA (US); Arturo Martinez, Moses Lakes, WA (US); Randall Donajkowski, Redmond, WA (US)

(73) Assignee: Terex South Dakota, Inc., Watertown, SD (US)

( * ) Notice: Subject to any disclaimer, the term of this patent is extended or adjusted under 35 U.S.C. 154(b) by 0 days.

(21) Appl. No.: 16/143,655

(22) Filed: Sep. 27, 2018

(65) Prior Publication Data
US 2020/0102762 A1   Apr. 2, 2020

(51) Int. Cl.
*F16D 63/00* (2006.01)
*E04G 21/16* (2006.01)
*B66C 1/24* (2006.01)
*B66F 11/04* (2006.01)

(52) U.S. Cl.
CPC ............. *E04G 21/167* (2013.01); *B66C 1/24* (2013.01); *B66F 11/044* (2013.01); *F16D 63/006* (2013.01)

(58) Field of Classification Search
CPC ........... E04G 21/167; E04G 1/15; E04G 5/00; E04G 5/14; B66C 1/24; B66F 11/046; B66F 11/04; E04B 1/35; E04B 2001/3588; B65G 49/06
See application file for complete search history.

(56) References Cited

U.S. PATENT DOCUMENTS

| | | | | | |
|---|---|---|---|---|---|
| 1,094,875 | A | * | 4/1914 | Carlson | B61B 3/00 104/89 |
| 2,178,956 | A | * | 11/1939 | Dyer | E04G 3/34 182/37 |
| 2,787,278 | A | * | 4/1957 | Mitchell | B66F 11/046 4/626 |
| 2,859,884 | A | * | 11/1958 | Pearce | E04G 21/16 52/745.11 |
| 3,018,842 | A | * | 1/1962 | Abrell | E04G 1/24 182/129 |

(Continued)

FOREIGN PATENT DOCUMENTS

| EP | 393004 A1 | * 10/1990 |
|---|---|---|
| GB | 2460622 A | 12/2009 |

(Continued)

*Primary Examiner* — Gregory W Adams
(74) *Attorney, Agent, or Firm* — Brooks Kushman P.C.

(57) ABSTRACT

A land vehicle, is provided with a mobile work platform assembly with a platform mounted to the land vehicle, sized to receive an operator thereupon. A frame extends from the platform. A positioner assembly includes a guide mounted on the frame of the mobile work platform assembly. A carriage is provided on the guide for translation along the guide. Hardware is provided on the carriage to support a workpiece upon the carriage external of a perimeter of the frame. The carriage includes a brake assembly to position the carriage at various positions along the guide.

13 Claims, 4 Drawing Sheets

(56) References Cited

U.S. PATENT DOCUMENTS

| | | | | |
|---|---|---|---|---|
| 3,282,377 | A * | 11/1966 | Pfeiffer | E04G 1/15 182/36 |
| 3,687,239 | A * | 8/1972 | Moehlenpah | B30B 15/028 188/43 |
| 3,696,890 | A * | 10/1972 | Armstrong | B64D 11/0007 186/40 |
| 3,791,094 | A * | 2/1974 | Shannon, Jr. | E04G 21/16 52/747.1 |
| 3,908,792 | A * | 9/1975 | Shortt | E01D 19/106 182/37 |
| 4,326,466 | A * | 4/1982 | Parry | B61C 13/06 104/172.4 |
| 4,555,890 | A * | 12/1985 | Gartner | E04B 1/35 52/745.11 |
| 4,811,819 | A * | 3/1989 | Sugiyama | E04G 3/34 182/129 |
| 4,979,589 | A * | 12/1990 | Sugiyama | E04G 5/12 182/138 |
| 5,148,889 | A * | 9/1992 | Fenwick | B65G 1/0492 182/115 |
| 5,174,349 | A * | 12/1992 | Svetlik | B23D 47/025 144/286.1 |
| 5,383,758 | A * | 1/1995 | Patrick | B66F 9/061 414/10 |
| 5,489,032 | A * | 2/1996 | Mayhall, Jr. | B66C 23/208 182/129 |
| 5,683,063 | A * | 11/1997 | Seiders | B66F 11/044 248/214 |
| 6,058,849 | A * | 5/2000 | Ostholt | B66C 7/04 104/93 |
| 6,647,847 | B2 * | 11/2003 | Hewitt | B27B 27/02 83/446 |
| 7,182,173 | B2 * | 2/2007 | Bailey | B66C 23/36 182/2.1 |
| 7,353,817 | B2 * | 4/2008 | Kobel | A62B 1/22 125/12 |
| 7,594,459 | B2 * | 9/2009 | Miller | B27B 27/02 144/252.1 |
| 7,600,959 | B2 | 10/2009 | Neubauer et al. | |
| 8,931,994 | B2 | 1/2015 | Creaney | |

FOREIGN PATENT DOCUMENTS

| | | | |
|---|---|---|---|
| JP | 06016366 A | * | 1/1994 |
| JP | 07197640 A | * | 8/1995 |
| JP | 2002167969 A | | 6/2002 |

* cited by examiner

POSITIONER FOR MOBILE WORK PLATFORMS

TECHNICAL FIELD

Various embodiments relate to mobile work platforms.

BACKGROUND

Mobile work platforms are employed for transporting and raising a worker to a work location that may otherwise difficult to reach.

SUMMARY

According to at least one embodiment, a positioner assembly includes a guide adapted to be mounted on a frame along a perimeter of a mobile work platform assembly. A carriage is provided on the guide for translation along the guide. Hardware is provided on the carriage to support a workpiece upon the carriage external of the mobile work platform assembly perimeter.

According to a further embodiment, the carriage includes a brake assembly to position the carriage at various positions along the guide.

According to another further embodiment, the guide is partially enclosed with a downward facing opening.

According to an even further embodiment, the carriage includes a trolley received within the partially enclosed guide with the hardware extending from the trolley through the opening.

According to an even further embodiment, the partially enclosed guide includes a substrate, a pair of upright sidewalls extending downward from the substrate, and a pair of tracks extending laterally inboard from lower ends of the pair of upright sidewalls.

According to another even further embodiment, the carriage includes a trolley base received within the partially enclosed guide. A plurality of wheels is mounted for rotation upon the trolley base and in engagement with the pair of tracks for translation of the trolley base along the pair of tracks.

According to another even further embodiment, the carriage further includes at least one horizontal wheel mounted for rotation upon the trolley base for engagement with at least one of the pair of upright sidewalls.

According to another even further embodiment, the carriage includes a brake assembly in cooperation with one of the pair of upright sidewalls of the partially enclosed guide to position the carriage at various positions along the guide.

According to another even further embodiment, the brake assembly includes a manual lever to disengage a brake from the guide.

According to another even further embodiment, the carriage further includes a trolley received within the partially enclosed guide. A trolley bracket extends from the trolley through the opening to support the hardware and the brake assembly.

According to another even further embodiment, the manual lever is pivotally connected to the trolley bracket. The brake assembly further includes a brake pad mounted to the manual lever.

According to another even further embodiment, a biasing member cooperates with the trolley bracket and the manual lever to bias the brake pad into engagement with the guide.

According to another even further embodiment, the pivotal connection of the manual lever and the trolley bracket is located beneath the guide. The guide further includes a tapered wall intersecting one of the pair of upright sidewalls and one of the pair of tracks to provide a brake surface that is generally perpendicular to a pivot direction of the manual lever.

According to another embodiment, a mobile work platform assembly includes a platform adapted to be mounted to a vehicle, sized to receive an operator thereupon. A frame extends from the platform. A positioner assembly includes a guide mounted on the frame of the mobile work platform assembly. A carriage is provided on the guide for translation along the guide. Hardware is provided on the carriage to support a workpiece upon the carriage external of the perimeter frame.

According to a further embodiment, the perimeter frame extends from a perimeter of the platform and defines an operator workspace therein.

According to another further embodiment, the frame includes an upper perimeter rail. The positioner assembly further includes brackets mounted to the guide to attach the positioner assembly to the upper perimeter rail.

According to an even further embodiment, the carriage includes a brake assembly in cooperation with the guide to position the carriage at various positions along the guide. The brake assembly includes a manual lever to disengage a brake from the guide. The manual lever does not extend above the positioner assembly brackets.

According to another embodiment, a land vehicle assembly includes a land vehicle, and a mobile work platform assembly with a platform mounted to the land vehicle, sized to receive an operator thereupon. A frame extends from the platform. A positioner assembly includes a guide mounted on the frame of the mobile work platform assembly. A carriage is provided on the guide for translation along the guide. Hardware is provided on the carriage to support a workpiece upon the carriage external of the perimeter frame.

According to another embodiment, a positioner assembly includes a guide adapted to be mounted on a frame of a mobile work platform assembly. A carriage is provided on the guide for translation along the guide. Hardware is provided on the carriage to support a workpiece upon the carriage. A brake assembly cooperates with the guide and the carriage to position the carriage at various positions along the guide.

According to another embodiment, a method to attaching a workpiece to a mobile work platform assembly disengages a brake on a carriage on a guide on a frame of a mobile work platform assembly. The carriage is translated along the guide to a selected position. The brake is reengaged. A workpiece is attached to hardware upon the carriage prior to raising the mobile work platform assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
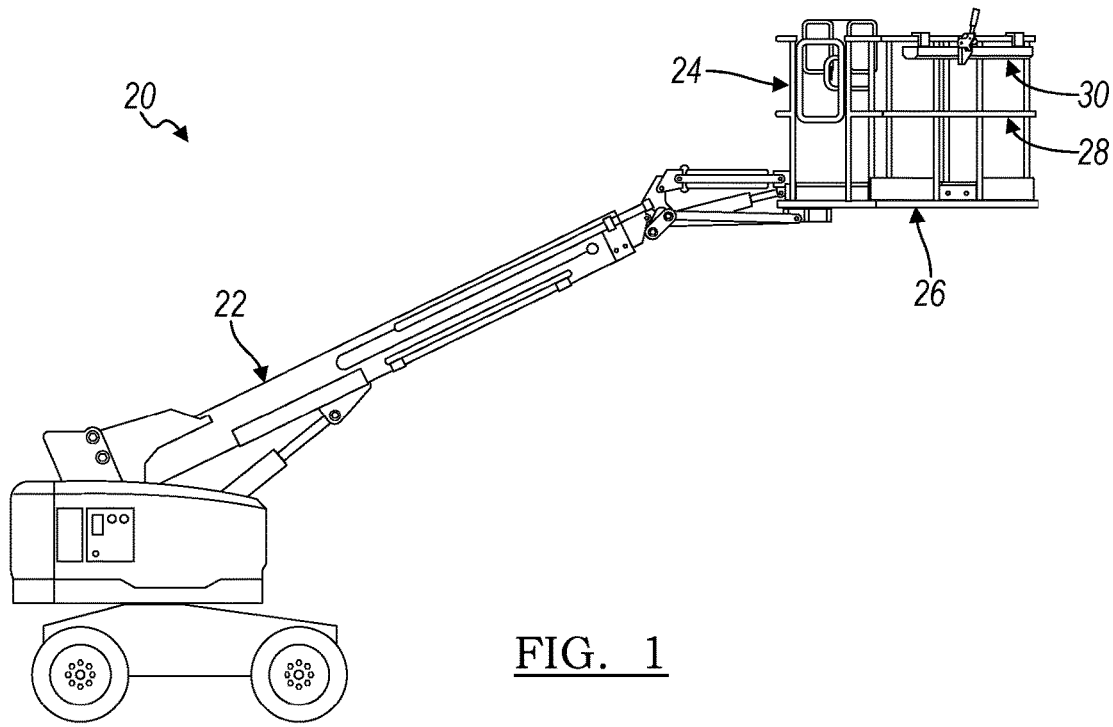
FIG. 1 is a side perspective view of an aerial lift according to an embodiment.

FIG. 1 illustrates a land vehicle according to an embodiment and depicted as an aerial lift 20. The aerial lift 20 is mobile and includes an articulated arm 22 for transporting and lifting a mobile work platform assembly 24, often referred to as a basket. The mobile work platform assembly 24 is illustrated in greater detail in FIG. 2. The mobile work platform assembly 24 includes a platform 26 sized to receive an operator upon the platform 26. A perimeter frame assembly 28 is provided upon the platform 26. The frame assembly 28 provides a frame of guard rails that extend around a perimeter of the platform 26 to contain an operator within the frame assembly 28. A door 29 is provided upon the frame assembly 28 to permit operator ingress to, and egress from, the frame assembly 28.

An aerial lift 20 is commonly used for translating and lifting an operator to an otherwise, difficult to reach work location. Such work locations are often elevated above ground. These work locations may require handling of materials that are raised to, or lowered from, the work locations. Often such material handling involves hanging the materials below the mobile work platform assembly 24, raising the mobile work platform assembly 24, and then manually manipulating the materials to a final position. Often, such materials are tied to the mobile work platform assembly 24, held by a second operator, or fastened temporarily to the mobile work platform assembly 24. Such material handling may be inconsistent or unproductive.

Figure 2:
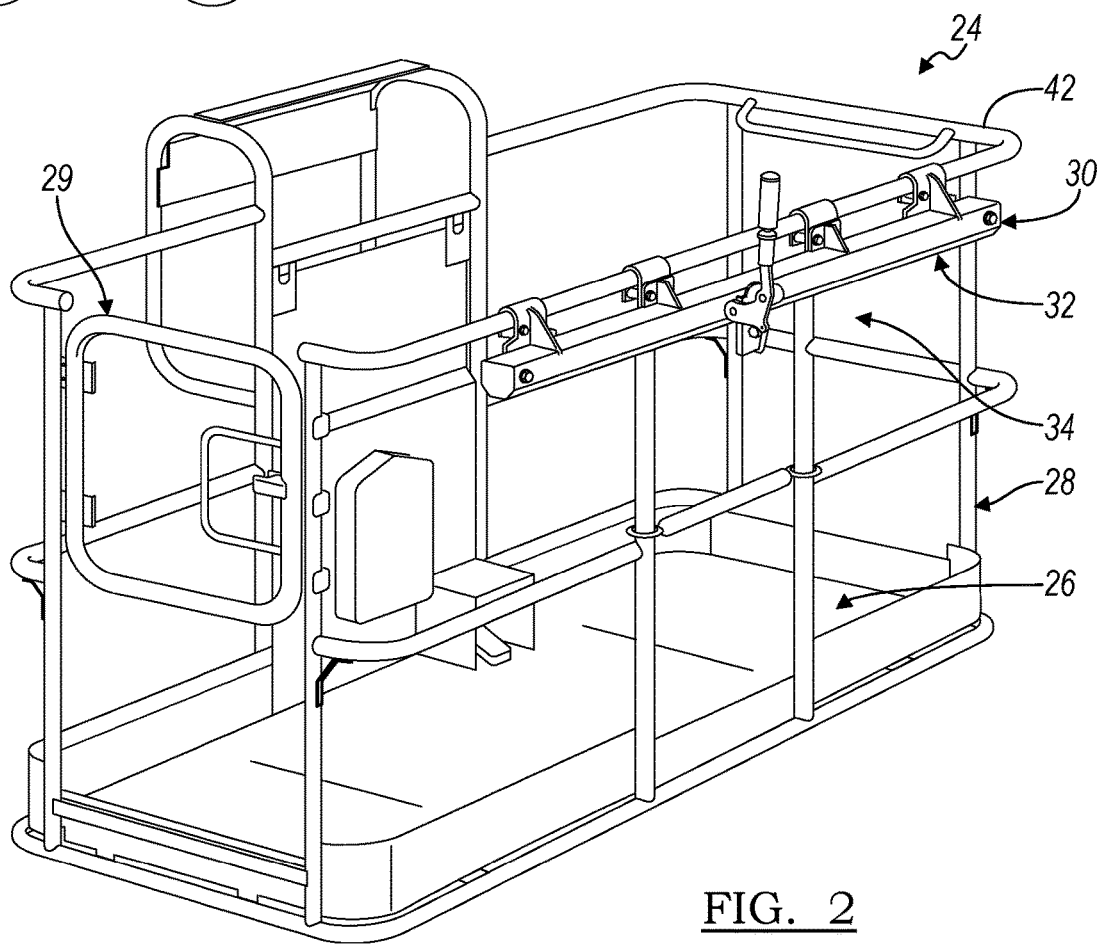
FIG. 2 is a front perspective view of a mobile work platform of the aerial lift of FIG. 1, according to another embodiment.
Figure 3:
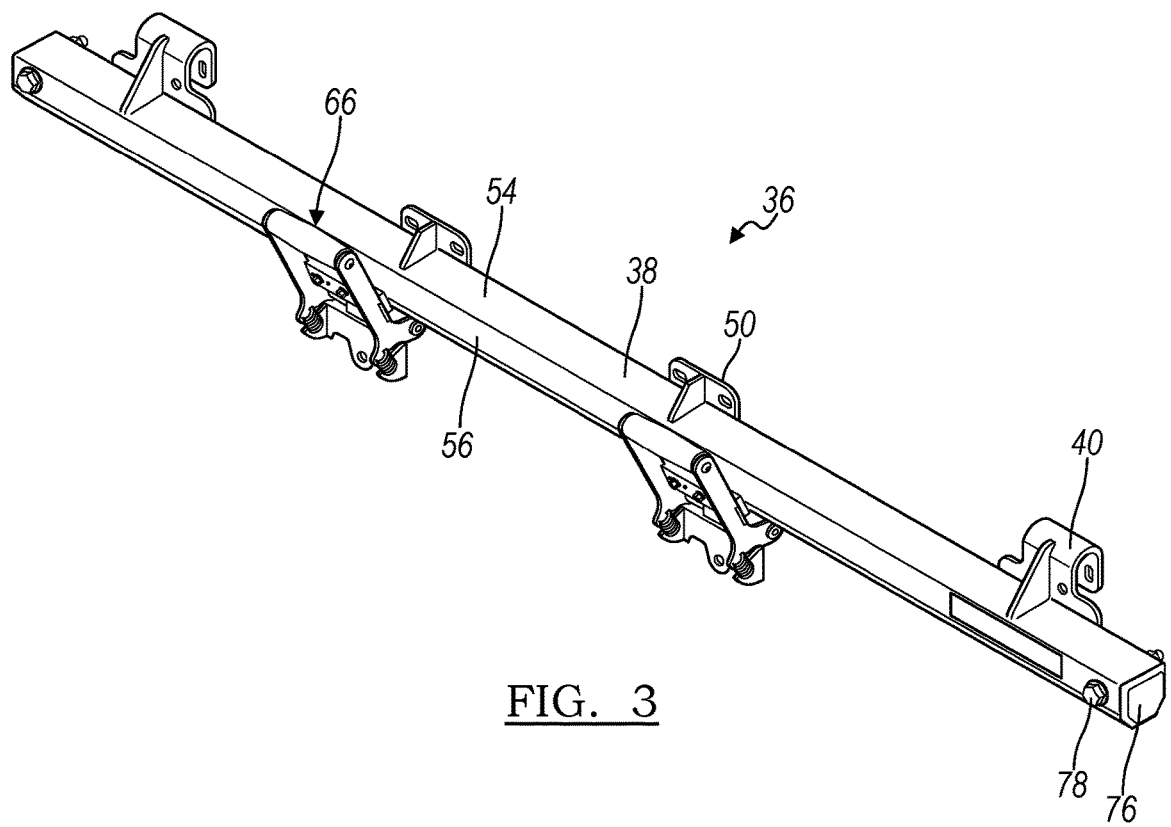
FIG. 3 is front perspective view of a material positioner assembly of the mobile work platform of FIG. 1, according to another embodiment.
Figure 4:
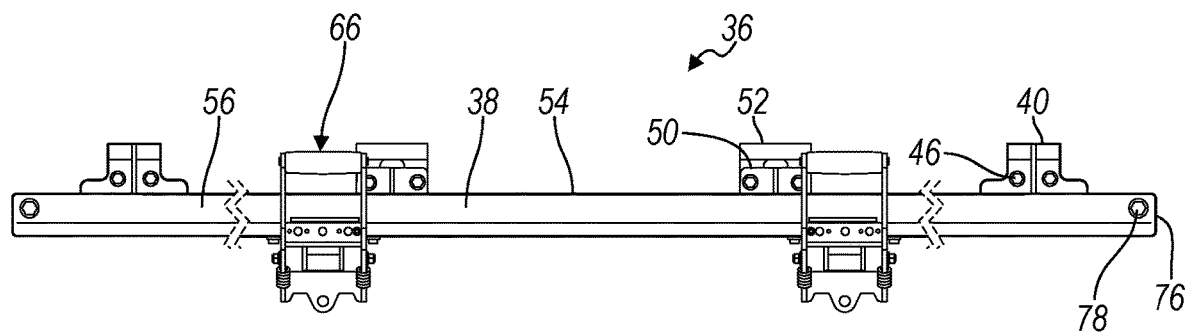
FIG. 4 is a front elevation view of the material positioner assembly of FIG. 3.
Figure 5:
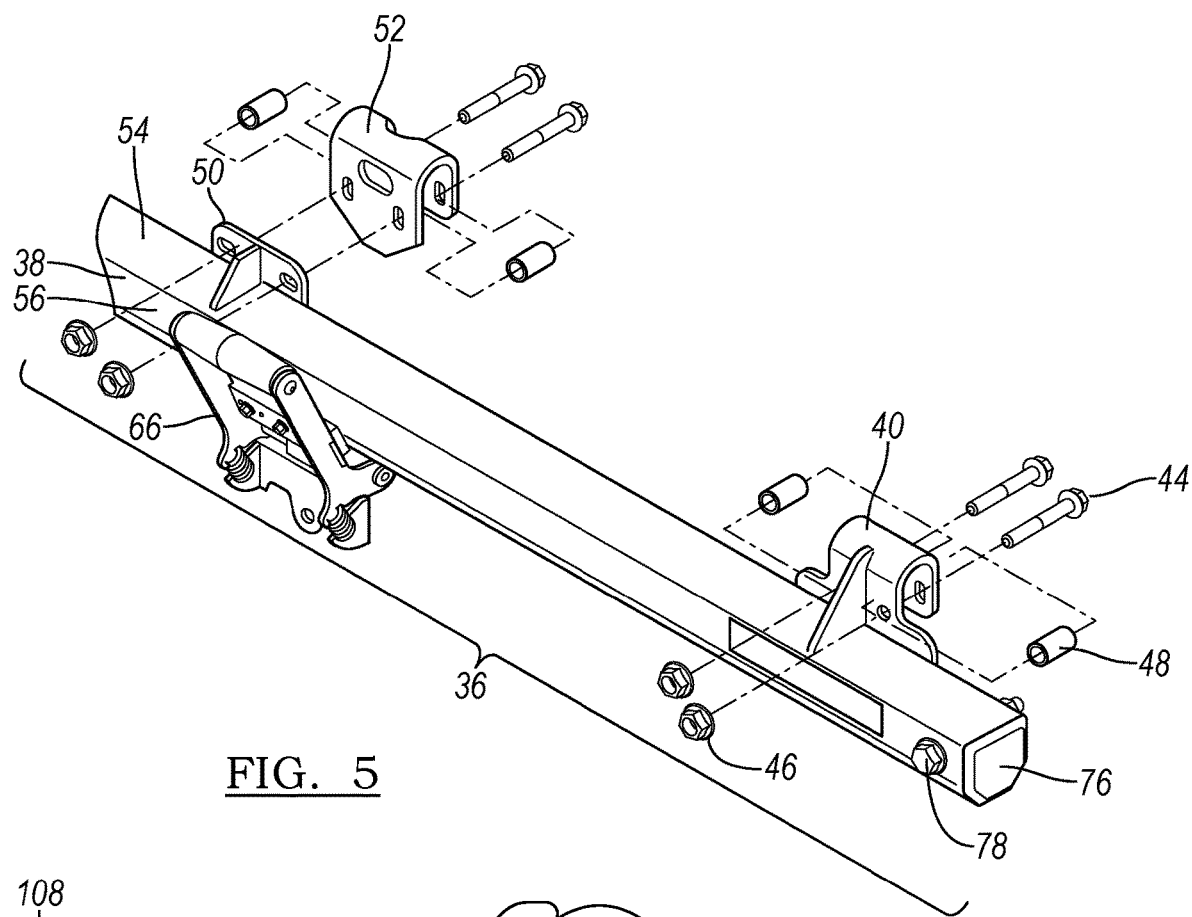
FIG. 5 is a partial exploded view of the material positioner assembly of FIG. 3.

According to an embodiment, a material positioner assembly 30 is provided on the perimeter frame assembly 28. Referring now to FIG. 2, the material positioner assembly 30 includes a guide 32 mounted to the perimeter frame assembly 28. A carriage or trolley assembly 34 cooperates with the guide 32 for translation along the guide 32. The trolley assembly 34 provides hardware for supporting material or a workpiece from the positioner assembly 30. The trolley assembly 34 also includes a brake assembly to position the trolley assembly 34 at various positions along the guide 32 while minimizing unnecessary translation of the trolley assembly 34 along the guide 32. Although one length of the guide 32 is illustrated, any suitable guide length may be employed. Although one trolley assembly 34 is illustrated, multiple trolley assemblies 34 may be utilized.

FIGS. 3-6 illustrate a material positioner assembly 36 according to another embodiment. The material positioner assembly 36 includes a guide 38, which may be formed as a weldment from suitable strength materials, such as steel alloys.

The material positioner assembly 36 includes a pair of hanger brackets 40 welded to the guide 38. The hanger brackets 40 are sized to shaped to extend over an upper perimeter rail 42 (FIG. 2) of the perimeter frame assembly 28 of the mobile work platform assembly 24. A plurality of threaded fasteners, such as bolts 44 and nuts 46 are utilized to fasten the hanger brackets 40 to the upper perimeter rail 42. Bushings 48 are also provided about the bolts 44 within the hanger brackets 40 to maintain installation repeatability when transferring the material positioner assembly 36 to another mobile work platform assembly 24. The bushings 48 also conceal the bolts 44 and minimize over tightening of the threaded fasteners 44, 46.

Any suitable hanger bracket 40 quantity is contemplated. Two fixed hanger brackets 40 are provided. To account for tolerance variances in the hanger brackets 40 and the upper perimeter rail 42, intermediate brackets 50 are provided along the guide 38 for attachment of adjustable hanger brackets 52.

Figure 6:
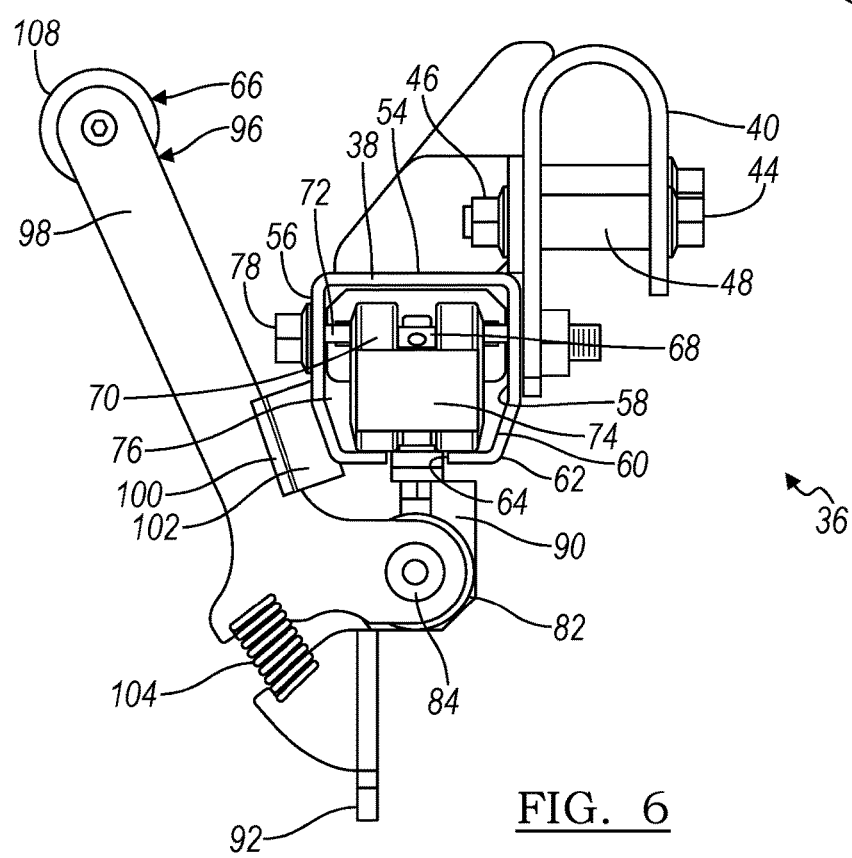
FIG. 6 is a side section view of the material positioner assembly of FIG. 3.

The guide 38 includes a lengthwise substrate 54 with a pair of downward extending sidewalls 56, 58. The hanger brackets 40 and intermediate brackets 50 are mounted directly to the substrate 54 and the inboard sidewall 58. A cross section of the guide 38 is illustrated in FIG. 6 for greater detail. A pair of tapered walls 60 extend downward and inward from the sidewalls 56, 58. A pair of tracks 62 extend inward from the tapered walls 60 and provide an opening 64 in the bottom of the guide 38. The substrate 54, sidewalls 56, 58, tapered walls 60 and tracks 62 provide a partially enclosed guide 38 with the opening 64.

Figure 7:
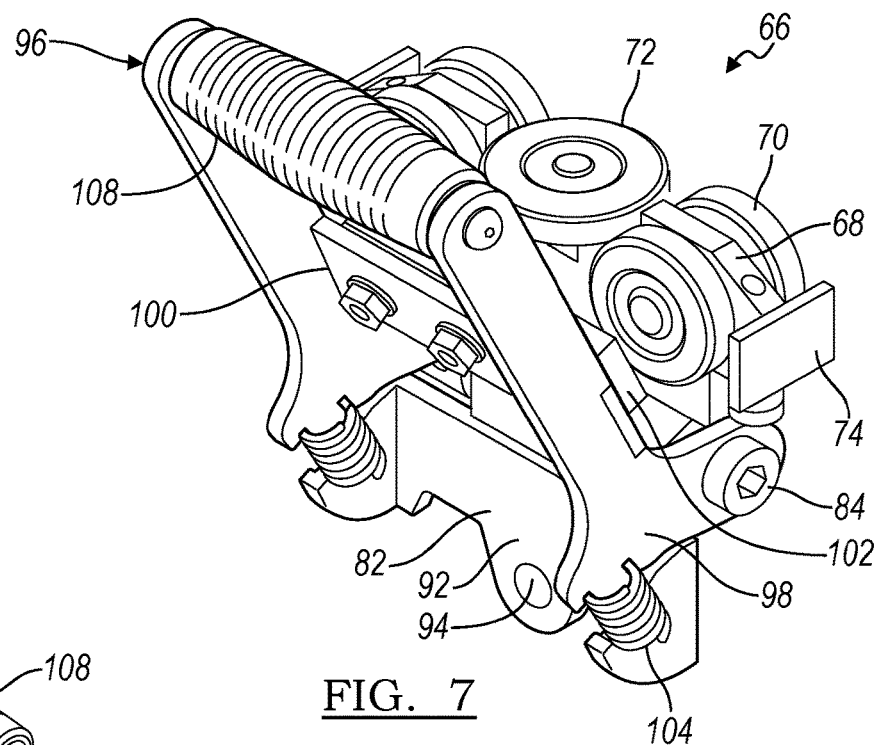
FIG. 7 is side perspective view of a trolley assembly of the material positioner assembly of FIG. 3.
Figure 8:
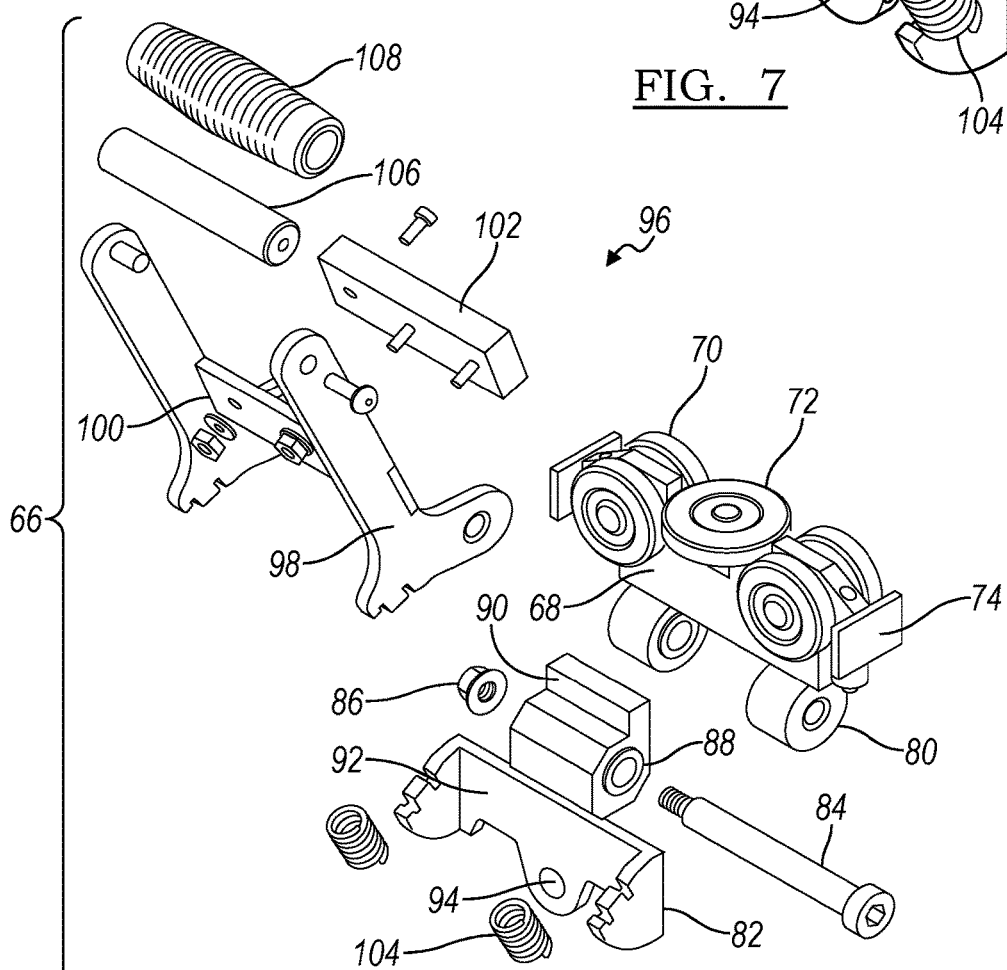
FIG. 8 is an exploded perspective view of the trolley assembly of FIG. 7.

The material positioner assembly 36 includes a pair of trolley assemblies 66 for limited translation and positioning along the guide 38. The trolley assemblies 66 are illustrated generally in FIGS. 3-5, and with additional detail in FIGS. 6-8. Referring now to FIGS. 6-8, the trolley assemblies 66 each include a base 68. A plurality of upright wheels 70 are connected for rotation to the base 68. The trolley base 68 and wheels 70 are sized to fit within the partially enclosed guide 38 and roll along the tracks 62. The trolley base 68 and wheels 70 are designed sufficiently robust to withstand applicable weights that are applied upon the material positioner assembly 36.

A horizontal wheel 72 is mounted for rotation upon the trolley base 68. Upon application of a transverse load, the horizontal wheel 72 engages the sidewalls 56, 58 to distribute transverse forces upon the trolley assembly 66 to the guide 38.

The trolley base 68 is formed with a pair of contact plates 74 at opposed distal ends. Referring again to FIGS. 3-6, a rubber bumper 76 is installed into each distal end of the guide 38 and fastened into place by threaded fasteners 78. The rubber bumpers 76 provide end stops to the travel of the trolley assemblies 66 along the guide 38.

A lower end of the trolley base 68 extends through the opening 64 in the guide 38. As illustrated in FIG. 8, a pair of bosses 80 extend below the trolley base 68. Referring now to FIGS. 5-8, a bracket 82 is assembled to the bosses 80 by a shoulder bolt 84 and nut 86. The bracket 82 includes a bushing 88 (FIG. 8) for receipt of the shoulder bolt 84. The bracket 82 includes an upper projection 90 (also FIG. 8) that extends along the trolley base 68 to prevent rotation of the bracket 82 relative to the trolley base 68. A mounting plate 92 extends below the bracket 82 with an aperture 94 for attaching material workpieces that are suspended from the trolley assembly 66.

Each trolley assembly 66 includes a brake assembly 96 to minimize movement of the trolley assembly 66 along the guide 38 in a static condition of the trolley assembly 66. The brake assembly 96 includes a pair of lever arms 98 pivotally connected to the shoulder bolt 84. The lever arms 98 are spaced apart and interconnected by a crossbar 100. A brake pad 102 is fastened to the crossbar 100. A pair of compression springs 104 are connected to the mounting plate 92 and the lever arms 98 to bias lever arms 98 toward the guide 38, and consequently the brake pad 102 into engagement with one of the tapered walls 60 of the guide 38. Referring to FIG. 6, the brake pad 102 and tapered wall 60 are aligned so that the tapered wall 60 is perpendicular to a pivot direction of the brake pad 102 about the shoulder bolt 84 such that the tapered wall 60 provides a braking surface 60 to the brake pad 102.

A handle 106 with a grip cover 108 are fastened between upper distal ends of the lever arms 98 to provide a handle for the operator. The handle 106 permits the operator to press the handle 106 down and away from the guide 38, to overcome the bias of the springs 104, and translate the trolley assembly 66 to a desired location. Removal of the manual force, permits the springs 104 to extend and reengage the brake pad 102 to the guide 38. With reference to FIG. 6, the handle 106 and grip 108 do not extend above the hanger brackets 40 for clearance of the handles relative to overhead obstructions that are also cleared by the hanger brackets 40 during movement of the mobile work platform assembly 24.

The material positioner assembly 36 is suitable for hanging materials from the aerial lift basket 24. The mounting plate 92 permits operators to attach steel cables and other rigging devices to lift materials and translate them along with the mobile work platform assembly 24.

Although a brake assembly 96 is illustrated and described, other suitable braking and locking assemblies may be employed, such as a cross drilled guide with a trolley with a cross pin, or the like.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A positioner assembly comprising:
a guide adapted to be mounted on a frame along a perimeter of a mobile work platform assembly;
a carriage provided on the guide for translation along the guide; and
hardware provided on the carriage to support a workpiece upon the carriage external of the mobile work platform assembly perimeter;
wherein the carriage comprises a brake assembly to position the carriage at various positions along the guide;
wherein the brake assembly further comprises a brake pad;
wherein the guide is partially enclosed with a downward facing opening;
wherein the partially enclosed guide includes a substrate, a pair of upright sidewalls extending downward from the substrate, and a pair of tracks extending laterally inboard from lower ends of the pair of upright sidewalls;
wherein the brake assembly is in cooperation with one of the pair of upright sidewalls of the partially enclosed guide to position the carriage at various positions along the guide;
wherein the brake assembly comprises a manual lever to disengage the brake pad from the guide;
wherein the carriage further comprises:
a trolley received within the partially enclosed guide, and
a trolley bracket extending from the trolley through the opening to support the hardware and the brake assembly;
wherein the manual lever is pivotally connected to the trolley bracket; and
wherein the brake pad is mounted to the manual lever.

2. The positioner assembly of claim 1 wherein the carriage comprises a trolley received within the partially enclosed guide with the hardware extending from the trolley through the opening.

3. The positioner assembly of claim 1 wherein the carriage comprises:
a trolley base received within the partially enclosed guide; and
a plurality of wheels mounted for rotation upon the trolley base and in engagement with the pair of tracks for translation of the trolley base along the pair of tracks.

4. The positioner assembly of claim 3 wherein the carriage further comprises at least one horizontal wheel mounted for rotation upon the trolley base for engagement with at least one of the pair of upright sidewalls.

5. The positioner assembly of claim 1 further comprising a biasing member cooperating with the trolley bracket and the manual lever to bias the brake pad into engagement with the guide.

6. The positioner assembly of claim 1 wherein the pivotal connection of the manual lever and the trolley bracket is located beneath the guide; and
wherein the guide further comprises a tapered wall intersecting one of the pair of upright sidewalls and one of the pair of tracks to provide a brake surface that is generally perpendicular to a pivot direction of the manual lever.

7. A mobile work platform assembly comprising:
a platform adapted to be mounted to a vehicle, sized to receive an operator thereupon;
a perimeter frame extending from the platform; and
the positioner assembly of claim 1 mounted to the perimeter frame.

8. The mobile work platform assembly of claim 7 wherein the perimeter frame extends from a perimeter of the platform and defines an operator workspace therein.

9. The mobile work platform assembly of claim 7 wherein the frame comprises an upper perimeter rail;
wherein the positioner assembly further comprises brackets mounted to the guide to attach the positioner assembly to the upper perimeter rail; and
wherein the manual lever does not extend above the positioner assembly brackets.

10. A land vehicle assembly comprising:
a land vehicle; and
a mobile work platform assembly according to claim 7, mounted to the land vehicle.

11. A positioner assembly comprising:
a guide adapted to be mounted on a frame along a perimeter of a mobile work platform assembly;
a carriage provided on the guide for translation along the guide; and hardware provided on the carriage to support a workpiece upon the carriage external of the mobile work platform assembly perimeter;

wherein the guide is partially enclosed with a downward facing opening;

wherein the partially enclosed guide includes a substrate, a pair of upright sidewalls extending downward from the substrate, and a pair of tracks extending laterally inboard from lower ends of the pair of upright sidewalls;

wherein the carriage comprises a brake assembly in cooperation with one of the pair of upright sidewalls of the partially enclosed guide to position the carriage at various positions along the guide;

wherein the brake assembly comprises a manual lever to disengage a brake from the guide;

wherein the carriage further comprises:
 a trolley received within the partially enclosed guide, and
 a trolley bracket extending from the trolley through the opening to support the hardware and the brake assembly;

wherein the manual lever is pivotally connected to the trolley bracket; and wherein the brake assembly further comprises a brake pad mounted to the manual lever.

12. The positioner assembly of claim 11 further comprising a biasing member cooperating with the trolley bracket and the manual lever to bias the brake pad into engagement with the guide.

13. The positioner assembly of claim 11 wherein the pivotal connection of the manual lever and the trolley bracket is located beneath the guide; and wherein the guide further comprises a tapered wall intersecting one of the pair of upright sidewalls and one of the pair of tracks to provide a brake surface that is generally perpendicular to a pivot direction of the manual lever.

\* \* \* \* \*